US012563113B2

(12) United States Patent
VanLandeghem et al.

(10) Patent No.: US 12,563,113 B2
(45) Date of Patent: Feb. 24, 2026

(54) METHODS TO DETERMINE A UNIQUE AUDIENCE FOR INTERNET-BASED MEDIA SUBJECT TO AGGREGATE- AND EVENT-LEVEL PRIVACY PROTECTION

(71) Applicant: The Nielsen Company (US), LLC, New York, NY (US)

(72) Inventors: Matthew VanLandeghem, Schaumburg, IL (US); Tahrima Mustafa, Lubbock, TX (US); Pengfei Yi, Shanghai (CN)

(73) Assignee: The Nielsen Company (US), LLC, New York, NY (US)

( * ) Notice: Subject to any disclaimer, the term of this patent is extended or adjusted under 35 U.S.C. 154(b) by 15 days.

(21) Appl. No.: 18/644,225

(22) Filed: Apr. 24, 2024

(65) Prior Publication Data

US 2024/0364764 A1 Oct. 31, 2024

Related U.S. Application Data

(60) Provisional application No. 63/498,302, filed on Apr. 26, 2023.

(51) Int. Cl.
| | |
|---|---|
| *H04L 67/10* | (2022.01) |
| *G06Q 30/0201* | (2023.01) |
| *H04L 67/306* | (2022.01) |
| *H04L 67/50* | (2022.01) |

(52) U.S. Cl.
CPC ......... *H04L 67/10* (2013.01); *G06Q 30/0201* (2013.01); *H04L 67/306* (2013.01); *H04L 67/535* (2022.05)

(58) Field of Classification Search
CPC ..... H04L 67/10; H04L 67/306; H04L 67/535; G06Q 30/0201
See application file for complete search history.

(56) References Cited

U.S. PATENT DOCUMENTS

| | | | | |
|---|---|---|---|---|
| 8,745,647 | B1 * | 6/2014 | Shin | H04N 21/442 |
| | | | | 725/9 |
| 9,070,139 | B2 * | 6/2015 | Zhang | G06Q 30/02 |
| 9,852,163 | B2 * | 12/2017 | Srivastava | G06F 16/215 |
| 10,237,419 | B2 * | 3/2019 | Shah | H04H 60/66 |
| 10,270,673 | B1 * | 4/2019 | Sheppard | G06Q 30/0244 |
| 10,324,960 | B1 * | 6/2019 | Skvortsov | G06F 16/955 |
| 11,783,353 | B2 | 10/2023 | VanLandeghem et al. | |
| 11,825,015 | B2 * | 11/2023 | Shah | H04M 15/84 |

(Continued)

*Primary Examiner* — David R Lazaro

(57) ABSTRACT

In one example, a computing system is described. The computing system is configured to perform a set of acts that includes obtaining, from a DEP, a non-redacted unique viewer count for a set of digital content exposures. The set of acts also includes obtaining, from the DEP via the protected cloud environment, a redacted exposures count for the set of digital content exposures. In addition, the set of acts includes determining, using an inverted reach curve and the non-redacted unique viewer count, an initial exposures value for the set of digital content exposures. The set of acts also includes scaling the initial exposures value using the redacted exposures count to obtain a final exposures value. Further, the set of acts includes determining, using a reach curve and the final exposures value, a final unique viewer count for the set of digital content exposures, and outputting the final unique viewer count.

20 Claims, 9 Drawing Sheets

(56) References Cited

U.S. PATENT DOCUMENTS

| | | | | |
|---|---|---|---|---|
| 2009/0055241 A1* | 2/2009 | Chen | ................. | G06Q 30/0205 |
| | | | | 705/7.29 |
| 2010/0088714 A1* | 4/2010 | Hawkins | ............... | H04H 20/14 |
| | | | | 725/14 |
| 2012/0158954 A1* | 6/2012 | Heffernan | .............. | H04L 67/01 |
| | | | | 709/224 |
| 2014/0304724 A1* | 10/2014 | Shin | .................... | H04N 21/442 |
| | | | | 725/10 |
| 2015/0095138 A1* | 4/2015 | Rao | ................. | H04N 21/44226 |
| | | | | 705/14.41 |
| 2017/0187478 A1* | 6/2017 | Shah | .................... | H04M 15/82 |
| 2018/0285921 A1* | 10/2018 | Levine | .............. | G06Q 30/0242 |
| 2018/0332177 A1* | 11/2018 | Shah | ................ | H04M 15/8055 |
| 2021/0357788 A1 | 11/2021 | VanLandeghem et al. | | |
| 2021/0357956 A1 | 11/2021 | Shao et al. | | |
| 2021/0357957 A1 | 11/2021 | VanLandeghem et al. | | |
| 2021/0357958 A1 | 11/2021 | Shao et al. | | |
| 2021/0357972 A1 | 11/2021 | VanLandeghem et al. | | |
| 2021/0357973 A1 | 11/2021 | VanLandeghem et al. | | |
| 2021/0385336 A1* | 12/2021 | Shah | ............... | H04N 21/44204 |
| 2024/0364764 A1* | 10/2024 | VanLandeghem | ...... | H04L 67/10 |

* cited by examiner

REPEAT FOR
ADDITIONAL
COMBINATIONS

302 — Obtain expected audience data

304 — Fit reach curve

306 — Store parameters

Suppose we have 4 panelists. Their impression (or pageview) distribution is as follows:

| Panelist id | Impressions | Imp Dist |
|---|---|---|
| p1 | 70 | 0.7 |
| p2 | 20 | 0.2 |
| p3 | 9 | 0.09 |
| p4 | 1 | 0.01 |

← 502

Suppose we have a single impression. Audience is 1, but we don't necessarily know which panelist it came from.
The probability would follow the implied distribution above-- it is most likely from panelist p1, but it could have come from any of the

Now suppose we have two impressions. What is the audience?
It could be 1 or 2. Both impressions could be served to the same panelist to generate audience of 1, or two different panelists to get
The combinations for two impressions is already starting to grow.

| Imp1 viewer | Imp2 viewer | Audience | Probability |
|---|---|---|---|
| p1 | p1 | 1 | 0.49 |
| p2 | p2 | 1 | 0.04 |
| p3 | p3 | 1 | 0.0081 |
| p4 | p4 | 1 | 0.0001 |
| p1 | p2 | 2 | 0.14 |
| p1 | p3 | 2 | 0.063 |
| p1 | p4 | 2 | 0.007 |
| p2 | p1 | 2 | 0.14 |
| p2 | p3 | 2 | 0.018 |
| p2 | p4 | 2 | 0.002 |
| p3 | p1 | 2 | 0.063 |
| p3 | p2 | 2 | 0.018 |
| p3 | p4 | 2 | 0.0009 |
| p4 | p1 | 2 | 0.007 |
| p4 | p2 | 2 | 0.002 |
| p4 | p3 | 2 | 0.0009 |

← 504

Not all scenarios are equally likely. For example, p1 + p1 is more likely than p4 + p4 given that p1 views such a larger proportion.
However, p4 + p4 is not impossible.

FIG. 5

To calculate the probabilities for 4 impressions

For each panelist combination, sum the probabilities, then take that sum to an exponent = impression value.

Then subtract lower-ordered groups (if applicable).

For example, for p1 and p2 : $(p1 + p2)^4 - p1^4 - p2^4$

To summarize, the probability of p1 and p2 is the probability of both seeing the impression less the probability of just one or the other viewing the impression To estimate the audience for any N number of impressions, we can enumerate the combinations of panelists. For 4 panelists, we have $2^4 - 1 = 15$ combinations of panelists.

We then calculate the probability for each combination of 1, 2, 3, or 4 panelists.

| imps | just p1 | just p2 | just p3 | just p4 | p1 and p2 | p2 and p3 | p1 and p3 | p1 and p4 | ... |
|---|---|---|---|---|---|---|---|---|---|
| 1 | 1 | 0.7 | 0.2 | 0.09 | 0.01 | 0 | 0 | 0 | 0 |
| 2 | 0.49 | 0.04 | 0.0081 | 0.0001 | 0.28 | 0.038 | 0.128 | 0.014 | |
| 3 | 0.343 | 0.008 | 0.006729 | 0.000001 | 0.378 | 0.03566 | 0.14931 | 0.01481 | |
| 4 | 0.2401 | 0.0016 | 0.00026561 | 0.00000001 | 0.4144 | 0.0054072 | 0.1493352 | 0.0140168 | |

Next, calculate expected audience by multiplying the probability by the number of people in each group.

Or to simplify, sum the probability of groups of 1, 2, 3, 4 then multiply by the number in that group.

| imps | 1 aud | 2 aud | 3 aud | 4 aud | expected |
|---|---|---|---|---|---|
| 1 | 1 | 0 | 0 | 0 | 1 |
| 2 | 0.5382 | 0.4618 | 0 | 0 | 1.46 |
| 3 | 0.35373 | 0.55941 | 8.69E-02 | 0 | 1.74 |
| 4 | 0.2417695 | 0.58359388 | 1.72E-01 | 0.0000024 | 1.94 |

← 602

Based on this panel distribution, we expect 1.94 audience for 4 impressions.

FIG. 6

| imps | pr (p1 exc) | pr (p2 excluded) | pr (p3 excluded) | pr (p4 excluded) | pr (p1 included) | pr (p2 included) | pr (p3 included) | pr (p4 included) | expected |
|---|---|---|---|---|---|---|---|---|---|
| 1 | 0.3 | 0.3 | 0.91 | 0.99 | 0.7 | 0.2 | 0.09 | 0.01 | 1 |
| 2 | 0.09 | 0.64 | 0.8281 | 0.9801 | 0.91 | 0.36 | 0.1719 | 0.0199 | 1.45 |
| 3 | 0.027 | 0.512 | 0.753571 | 0.970299 | 0.973 | 0.488 | 0.246429 | 0.029701 | 1.74 |
| 4 | 0.0081 | 0.4096 | 0.68574961 | 0.96059601 | 0.9919 | 0.5904 | 0.31425039 | 0.03940399 | 1.94 |

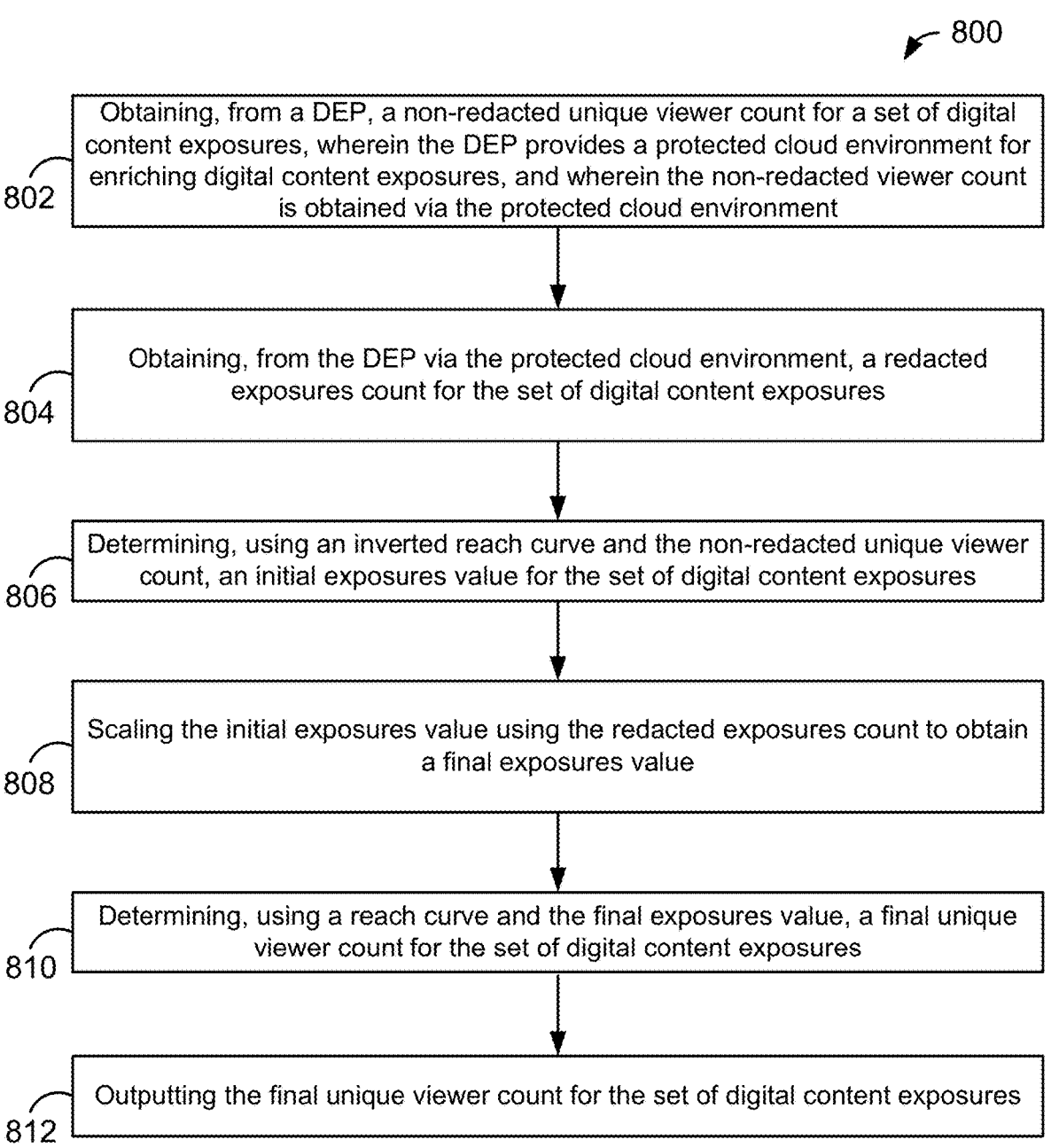

800

Obtaining, from a DEP, a non-redacted unique viewer count for a set of digital content exposures, wherein the DEP provides a protected cloud environment for enriching digital content exposures, and wherein the non-redacted viewer count is obtained via the protected cloud environment

802

Obtaining, from the DEP via the protected cloud environment, a redacted exposures count for the set of digital content exposures

804

Determining, using an inverted reach curve and the non-redacted unique viewer count, an initial exposures value for the set of digital content exposures

806

Scaling the initial exposures value using the redacted exposures count to obtain a final exposures value

808

Determining, using a reach curve and the final exposures value, a final unique viewer count for the set of digital content exposures

810

Outputting the final unique viewer count for the set of digital content exposures

METHODS TO DETERMINE A UNIQUE AUDIENCE FOR INTERNET-BASED MEDIA SUBJECT TO AGGREGATE- AND EVENT-LEVEL PRIVACY PROTECTION

CROSS-REFERENCE TO RELATED APPLICATIONS

This disclosure claims priority to U.S. Provisional Pat. App. No. 63/498,302, filed Apr. 26, 2023, which is hereby incorporated by reference herein in its entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

An audience measurement entity (AME) can provide third-party measurement of a set of digital content exposures (e.g., a campaign running on a website) by directly integrating with a data enrichment providers (DEPs) first-party data via a protected cloud environment. Through such an integration, the AME can obtain aggregated data, rather than respondent-level data. This can help protect user privacy.

User privacy can also be protected at the event level. For instance, the DEP may remove or redact all user-level information for privacy-sensitive events and/or remove user-level information for users that have opted out of measurement. This redaction can adversely affect the quality and consistency of the aggregated information that the AME can extract from DEPs.

Described herein are systems and methods for estimating the unique viewer count of a set of digital content exposures that address this and potentially other issues by using redacted exposure counts and a reach curve.

In one aspect, a computing system is described. The computing system includes a processor and a memory. The computing system is configured to perform a set of acts. The set of acts includes obtaining, from a DEP, a non-redacted unique viewer count for a set of digital content exposures. The DEP provides a protected cloud environment for enriching digital content exposures, and the non-redacted viewer count is obtained via the protected cloud environment. The set of acts also includes obtaining, from the DEP via the protected cloud environment, a redacted exposures count for the set of digital content exposures. In addition, the set of acts includes determining, using an inverted reach curve and the non-redacted unique viewer count, an initial exposures value for the set of digital content exposures. The set of acts also includes scaling the initial exposures value using the redacted exposures count to obtain a final exposures value. Further, the set of acts includes determining, using a reach curve and the final exposures value, a final unique viewer count for the set of digital content exposures. And the set of acts includes outputting the final unique viewer count for the set of digital content exposures.

In another aspect, a method is described. The method includes obtaining, from a DEP, a non-redacted unique viewer count for a set of digital content exposures. The DEP provides a protected cloud environment for enriching digital content exposures, and the non-redacted viewer count is obtained via the protected cloud environment. The method also includes obtaining, from the DEP via the protected cloud environment, a redacted exposures count for the set of digital content exposures. In addition, the method includes determining, using an inverted reach curve and the non-redacted unique viewer count, an initial exposures value for the set of digital content exposures. The method also includes scaling the initial exposures value using the redacted exposures count to obtain a final exposures value. Further, the method includes determining, using a reach curve and the final exposures value, a final unique viewer count for the set of digital content exposures. And the method includes outputting the final unique viewer count for the set of digital content exposures.

In another aspect, a non-transitory computer-readable medium is described. The non-transitory computer-readable medium has stored therein instructions that when executed by a computing system cause the computing system to perform a set of acts. The set of acts includes obtaining, from a DEP, a non-redacted unique viewer count for a set of digital content exposures. The DEP provides a protected cloud environment for enriching digital content exposures, and the non-redacted viewer count is obtained via the protected cloud environment. The set of acts also includes obtaining, from the DEP via the protected cloud environment, a redacted exposures count for the set of digital content exposures. In addition, the set of acts includes determining, using an inverted reach curve and the non-redacted unique viewer count, an initial exposures value for the set of digital content exposures. The set of acts also includes scaling the initial exposures value using the redacted exposures count to obtain a final exposures value. Further, the set of acts includes determining, using a reach curve and the final exposures value, a final unique viewer count for the set of digital content exposures. And the set of acts includes outputting the final unique viewer count for the set of digital content exposures.

BRIEF DESCRIPTION OF THE DRAWINGS

FIG. 5 shows example data.

FIG. 6 shows additional example data.

FIG. 7 shows additional example data.

FIG. 8 is a flowchart of an example method.

DETAILED DESCRIPTION

I. Overview

Figure 1:
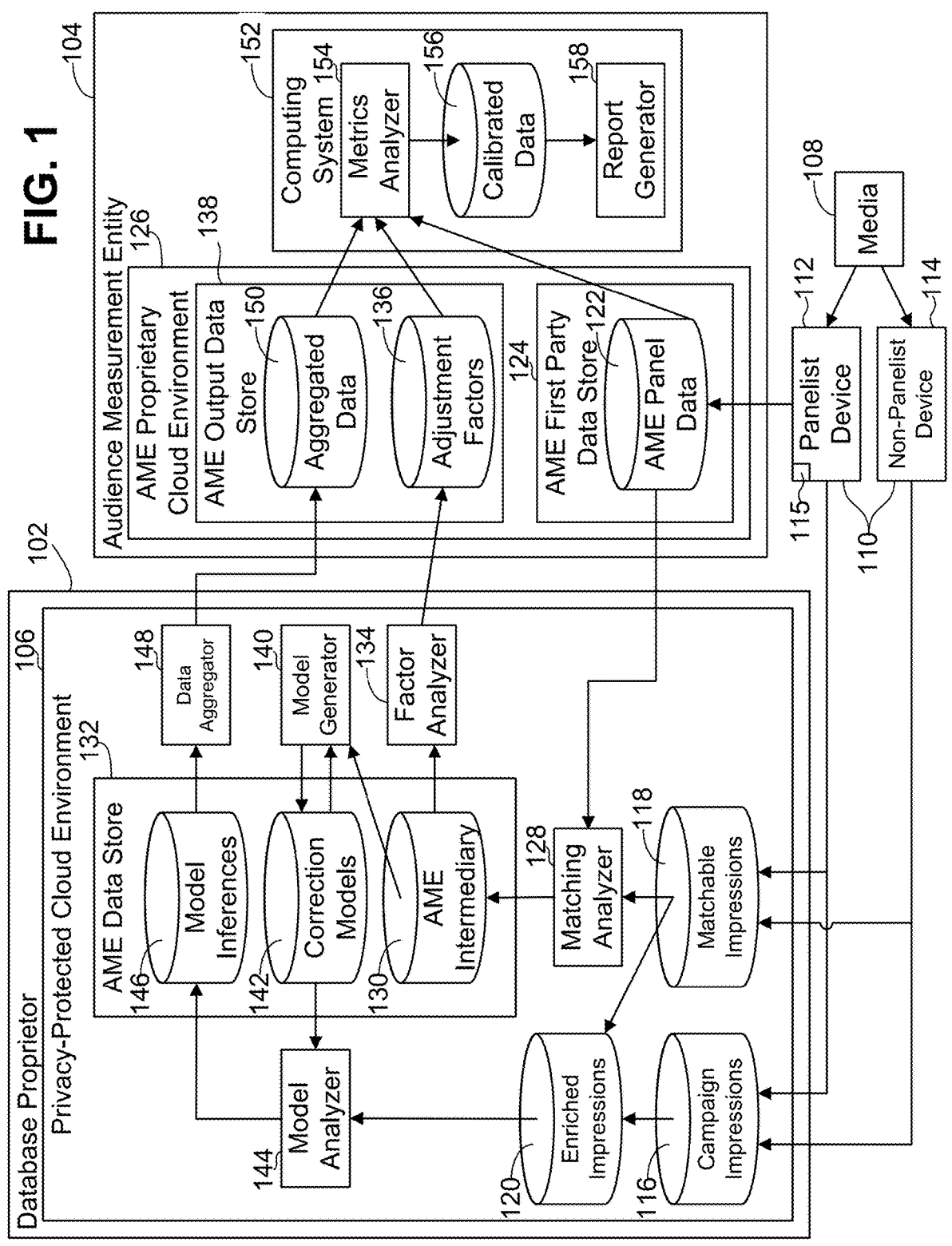
FIG. 1 is a conceptual illustration of an example measurement system.

Protection of online user privacy continues to evolve, with various legislation (e.g. General Data Protection Regulation (GDPR)) influencing the signals that can be collected and shared by DEPs such as Google, Facebook, and several others. Measurement of digital content exposures (e.g., online advertising campaigns) by third-party AMEs, such as Nielsen, has similarly evolved. Direct integrations between DEPs and AMEs are more common. By way of example, an AME can provide third-party measurement of a set of digital content exposures (e.g., campaigns running on a website) by directly integrating with a DEPs first-party data via a protected cloud environment.

As one example, an AME can provide third-party measurement of campaigns running on Youtube.com (and some associated websites) by directly integrating with Google's first-party data via Ads Data Hub (ADH). ADH is a protected cloud environment where digital content exposures on Youtube.com (and some associated websites) are collected and enriched with Google's first party data. Within ADH, the AME is able to run some of the calibration steps. Further calibrations are applied once data are aggregated and extracted from ADH. Allowing only aggregated data, rather than respondent-level data, is one of the ways user privacy is protected by ADH. Several methodologies associated with creating and applying calibrations when integrating with third-party protected cloud environments are described in the following patent applications, each of which is hereby incorporated by reference in their entireties: U.S. patent application Pub. Ser. No. 17/318,766 filed May 12, 2021, U.S. patent application Pub. Ser. No. 17/317,616 filed May 11, 2021, U.S. patent application Pub. Ser. No. 17/318,517 filed May 12, 2021, U.S. patent application Pub. Ser. No. 17/317,461 filed May 11, 2021, U.S. patent application Pub. Ser. No. 17/318,420 filed May 12, 2021, U.S. patent application Pub. Ser. No. 17/317,404 filed May 11, 2021, and U.S. patent application Pub. Ser. No. 17/316,168 filed May 10, 2021.

User privacy can also be protected at the event level. In one approach, the DEP can define criteria for which a digital content exposure is considered "privacy-sensitive." For example, the DEP may deem a particular digital content exposure as "privacy-sensitive" because they believe a person under the age of 13 (the minimum age for registration with most DEPs) was viewing when the digital content was served. Such a case could arise when an advertisement was served on a video that would be considered "kids content," or the advertisement was viewed during a certain time of day, or on a certain device, or a combination of factors. In these cases, the DEP removes or redacts all user-level information, including unique identifier(s). Similarly, the DEP removes or redacts all user-level information for users that have opted out of measurement. Overall, the DEP can define a wide range of criteria by which user-level information is redacted, including, but not limited to, the examples above. For ease of explanation, these types of digital content exposures are collectively referred to as "redacted digital content exposures."

Redacted digital content exposures can directly affect the quality and consistency of the aggregated information that third-parties (e.g., AMEs) can extract from DEPs. For example, suppose a particular user view a digital content item twice. For one of the impressions, the DEP has applied their "privacy-sensitive" criteria and has removed the unique identifiers originally attached to the impression. When an AME aggregates this data from the DEP, the extracted data will contain one impression with a known user identifier and one impression where the user identifier is not known because it has been redacted. Further, a calibration methodology may be based on an assumption that the impression with the known user identifier comes from one segment of the population, and the impression without a user identifier comes from a different, non-overlapping segment of the population. Said otherwise, the calibration methodology may be based on an assumption that the two impressions come from mutually exclusive groups. Because of this assumption, the calibration methodology will estimate a total of two unique viewers ("unique audience"), although there is actually a single viewer in this example. Consequently, the assumption of mutually-exclusive groups overestimates the total number of viewers.

Described herein are systems and methods for estimating the unique viewer count for a set of digital content exposures that address this and potentially other issues by relaxing the assumption. Some DEPs provide an indicator or flag for redacted digital content exposures, which allow for aggregating and counting redacted digital content exposures separately from non-redacted digital content exposures. Within examples, a count of redacted digital content exposures as well as a count of distinct user identifiers for non-redacted digital content exposures are provided as input to a reach curve model. The reach curve model can provide a non-linear estimate of the redacted digital content exposures' incremental audience. Because the estimate is non-linear, the reach curve model implicitly assumes that a given user can generate both redacted and non-redacted digital content exposures. Using the reach curve model therefore provides an improvement over prior audience estimating techniques that rely on the above-referenced mutually exclusive assumption and are susceptible to overcounting.

Various other features of these systems and methods are described hereinafter with reference to the accompanying figures.

II. Example Measurement System

FIG. 1 is a conceptual illustration an example measurement system 100. The measurement system 100 may enable the generation of audience measurement metrics based on the merging of data collected by a database proprietor 102 and an AME 104. More particularly, in some examples, the data includes AME panel data (that includes media impressions for panelists that are associated with demographic information collected by the AME 104) and database proprietor impressions data (which may be enriched with demographic and/or other information available to the database proprietor 102). In the illustrated example, these disparate sources of data are combined within a privacy-protected cloud environment 106 managed and/or maintained by the database proprietor 102.

The privacy-protected cloud environment 106 is a cloud-based environment that enables media providers (e.g., advertisers and/or content providers) and third parties (e.g., the AME 104) to input and combine their data with data from the database proprietor 102 inside a data warehouse or data store that enables efficient big data analysis. The combining of data from different parties (e.g., different Internet domains) presents risks to the privacy of the data associated with individuals represented by the data from the different parties. Accordingly, the privacy-protected cloud environment 106 is established with privacy constraints that prevent any associated party (including the database proprietor 102) from accessing private information associated with particular individuals. Rather, any data extracted from the privacy-protected cloud environment 106 following a big data analysis and/or query is limited to aggregated information. A specific example of the privacy-protected cloud environment 106 is the Ads Data Hub (ADH) developed by Google.

As used herein, a media impression is defined as an occurrence of access and/or exposure to media 108 (e.g., an advertisement, a movie, a movie trailer, a song, a web page banner, etc.). Examples disclosed herein may be used to monitor for media impressions of any one or more media types (e.g., video, audio, a web page, an image, text, etc.). In examples disclosed herein, the media 108 may be program content and/or advertisements. Examples disclosed herein are not restricted for use with any particular type of media. On the contrary, examples disclosed herein may be implemented in connection with tracking impressions for media of any type or form in a network.

Content providers and/or advertisers distribute the media 108 via the Internet to users that access websites and/or online television services (e.g., web-based TV, Internet protocol TV (IPTV), etc.). For purposes of explanation, examples disclosed herein are described assuming the media 108 is an advertisement that may be provided in connection with particular content of primary interest to a user. In some examples, the media 108 is served by media servers managed by and/or associated with the database proprietor 102 that manages and/or maintains the privacy-protected cloud environment 106. For example, the database proprietor 102 may be Google, and the media 108 corresponds to ads served with videos accessed via Youtube.com and/or via other Google video partners (GVPs). More generally, in some examples, the database proprietor 102 includes corresponding database proprietor servers that can serve media 108 to individuals via client devices 110. In the illustrated example of FIG. 1, the client devices 110 may be stationary or portable computers, handheld computing devices, smart phones, Internet appliances, smart televisions, and/or any other type of device that may be connected to the Internet and capable of presenting media. For purposes of explanation, the client devices 110 of FIG. 1 include panelist client devices 112 and non-panelist client devices 114 to indicate that at least some individuals that access and/or are exposed to the media 108 correspond to panelists who have provided detailed demographic information to the AME 104 and have agreed to enable the AME 104 to track their exposure to the media 108. In many situations, other individuals who are not panelists will also be exposed to the media 108 (e.g., via the non-panelist client devices 114). The number of non-panelist audience members for a particular media item may be significantly greater than the number of panelist audience members. In some examples, the panelist client devices 112 may include and/or implement an audience measurement meter 115 that captures the impressions of media 108 accessed by the panelist client devices 112 (along with associated information) and reports the same to the AME 104. In some examples, the audience measurement meter 115 may be a separate device from the panelist client device 112 used to access the media 108.

In some examples, the media 108 is associated with a unique impression identifier (e.g., a consumer playback nonce (CPN)) generated by the database proprietor 102. In some examples, the impression identifier serves to uniquely identify a particular impression of the media 108. Thus, even though the same media 108 may be served multiple times, each time the media 108 is served the database proprietor 102 will generate a new and different impression identifier so that each impression of the media 108 can be distinguished from every other impression of the media. In some examples, the impression identifier is encoded into a uniform resource locator (URL) used to access the primary content (e.g., a particular YouTube video) along with which the media 108 (as an advertisement) is served. In some examples, with the impression identifier (e.g., CPN) encoded into the URL associated with the media 108, the audience measurement meter 115 extracts the identifier at the time that a media impression occurs so that the AME 104 is able to associate a captured impression with the impression identifier.

In some examples, the meter 115 may not be able to obtain the impression identifier (e.g., CPN) to associate with a particular media impression. For instance, in some examples where the panelist client device 112 is a mobile device, the meter 115 collects a mobile advertising identifier (MAID) and/or an identifier for advertisers (IDFA) that may be used to uniquely identify client devices 110 (e.g., the panelist client devices 112 being monitored by the AME 104). In some examples, the meter 115 reports the MAID and/or IDFA for the particular device associated with the meter 115 to the AME 104. The AME 104, in turn, provides the MAID and/or IDFA to the database proprietor 102 in a double-blind exchange through which the database proprietor 102 provides the AME 104 with the impression identifiers (e.g., CPNs) associated with the client device 110 identified by the MAID and/or IDFA. Once the AME 104 receives the impression identifiers for the client device 110 (e.g., a particular panelist client device 112), the impression identifiers are associated with the impressions previously collected in connection with the device.

In the illustrated example, the database proprietor 102 logs each media impression occurring on any of the client devices 110 within the privacy-protected cloud environment 106. In some examples, logging an impression includes logging the time the impression occurred and the type of client device 110 (e.g., whether a desktop device, a mobile device, a tablet device, etc.) on which the impression occurred. Further, in some examples, impressions are logged along with the impression's unique impression identifier. In this example, the impressions and associated identifiers are logged in a campaign impressions database 116. The campaign impressions database 116 stores all impressions of the media 108 regardless of whether any particular impression was detected from a panelist client device 112 or a non-panelist client device 114. Furthermore, the campaign impressions database 116 stores all impressions of the media 108 regardless of whether the database proprietor 102 is able to match any particular impression to a particular registered user of the database proprietor 102.

As mentioned above, in some examples, the database proprietor 102 identifies a particular registered user (e.g., subscriber) associated with a particular media impression based on a cookie stored on the client device 110. In some examples, the database proprietor 102 associates a particular media impression with a registered user that was signed into the online services of the database proprietor 102 at the time the media impression occurred. In some examples, in addition to logging such impressions and associated identifiers in the campaign impressions database 116, the database proprietor 102 separately logs such impressions in a matchable impressions database 118. As used herein, a matchable impression is an impression that the database proprietor 102 is able to match to at least one of a particular registered user (e.g., because the impression occurred on a client device 110 on which a registered user was signed into the database proprietor 102) or a particular client device 110 (e.g., based on a first-party cookie of the database proprietor 102 detected on the client device 110). In some examples, if the database proprietor 102 cannot match a particular media impression (e.g., because no registered user was signed in at the time the media impression occurred and there is no recognizable cookie on the associated client device 110) the impressions is omitted from the matchable impressions database 118 but is still logged in the campaign impressions database 116.

As indicated above, the matchable impressions database 118 includes media impressions (and associated unique impression identifiers) that the database proprietor 102 is able to match to a particular user that has registered with the database proprietor 102. As mentioned above, the matchable impressions database 118 also includes impressions matched to particular client devices 110 (based on first-party cookies), even when the impressions cannot be matched to particular registered users (based on the registered users being signed in at the time). In some such examples, the impressions matched to particular client devices 110 are treated as distinct users within the matchable impressions database 118. However, as no particular user can be identified, such impressions in the matchable impressions database 118 will not be associated with any user-based covariates.

Although only one campaign impressions database 116 is shown in the illustrated example, the privacy-protected cloud environment 106 may include any number of campaign impressions databases 116, with each database storing impressions corresponding to different media campaigns associated with one or more different advertisers (e.g., product manufacturers, service providers, retailers, advertisement servers, etc.). In other examples, a single campaign impressions database 116 may store the impressions associated with multiple different campaigns. In some such examples, the campaign impressions database 116 may store a campaign identifier in connection with each impression to identify the particular campaign to which the impression is associated. Similarly, in some examples, the privacy-protected cloud environment 106 may include one or more matchable impressions databases 118 as appropriate. Further, in some examples, the campaign impressions database 116 and the matchable impressions database 118 may be combined and/or represented in a single database.

In the illustrated example of FIG. 1, impressions occurring on the client devices 110 are shown as being reported (e.g., via network communications) directly to both the campaign impressions database 116 and the matchable impressions database 118. However, this should not be interpreted as necessarily requiring multiple separate network communications from the client devices 110 to the database proprietor 102. Rather, in some examples, notifications of impressions are collected from a single network communication from the client device 110, and the database proprietor 102 then populates both the campaign impressions database 116 and the matchable impressions database 118. In some examples, the matchable impressions database 118 is generated based on an analysis of the data in the campaign impressions database 116. Regardless of the particular process by which the two databases 116, 118 are populated with logged impressions, in some examples, the user-based covariates included in the matchable impressions database 118 may be combined with the logged impressions in the campaign impressions database 116 and stored in an enriched impressions database 120. Thus, the enriched impressions database includes all (e.g., census wide) logged impressions of the media 108 for the relevant advertising campaign and also includes all logged impressions that the database proprietor 102 was able to match to a particular registered user.

As shown in the illustrated example, whereas the database proprietor 102 is able to collect impressions from both panelist client devices 112 and non-panelist client devices

114, the AME 104 may be limited to collecting impressions from panelist client devices 112. In some examples, the AME 104 also collects the impression identifier associated with each collected media impression so that the collected impressions may be matched with the impressions collected by the database proprietor 102 as described further below. In the illustrated example, the impressions (and associated impression identifiers) of the panelists are stored in an AME panel data database 122 that is within an AME first party data store 124 in an AME proprietary cloud environment 126.

In some examples, the AME proprietary cloud environment 126 is a cloud-based storage system (e.g., a Google Cloud Project) provided by the database proprietor 102 that includes functionality to enable interfacing with the privacy-protected cloud environment 106 also maintained by the database proprietor 102. As mentioned above, the privacy-protected cloud environment 106 is governed by privacy constraints that prevent any party (with some limited exceptions for the database proprietor 102) from accessing private information associated with particular individuals. By contrast, the AME proprietary cloud environment 126 is indicated as proprietary because it is exclusively controlled by the AME such that the AME has full control and access to the data without limitation. While some examples involve the AME proprietary cloud environment 126 being a cloud-based system that is provided by the database proprietor 102, in other examples, the AME proprietary cloud environment 126 may be provided by a third party distinct from the database proprietor 102.

While the AME 104 may be limited to collecting impressions (and associated identifiers) from only panelists (e.g., via the panelist client devices 112), the AME 104 might be able to collect panel data that is much more robust than merely media impressions. As mentioned above, the panelist client devices 112 are associated with users that have agreed to participate on a panel of the AME 104. Participation in a panel includes the provision of detailed demographic information about the panelist and/or all members in the panelist's household. Such demographic information may include age, gender, race, ethnicity, education, employment status, income level, geographic location of residence, etc. In addition to such demographic information, which may be collected at the time a user enrolls as a panelist, the panelist may also agree to enable the AME 104 to track and/or monitor various aspects of the user's behavior. For example, the AME 104 may monitor panelists' Internet usage behavior including the frequency of Internet usage, the times of day of such usage, the websites visited, and the media exposed to (from which the media impressions are collected).

AME panel data (including media impressions and associated identifiers, demographic information, and Internet usage data) is shown in FIG. 1 as being provided directly to the AME panel data database 122 from the panelist client devices 112. However, in some examples, there may be one or more intervening operations and/or components that collect and/or process the collected data before it is stored in the AME panel data database 122. For instance, in some examples, impressions are initially collected and reported to a separate server and/or database that is distinct from the AME proprietary cloud environment 126. In some such examples, this separate server and/or database may not be a cloud-based system. Further, in some examples, such a non-cloud-based system may interface directly with the privacy-protected cloud environment 106 such that the AME proprietary cloud environment 126 may be omitted entirely.

In some examples, there may be multiple different techniques and/or methodologies used to collect the AME panel data that depends on the particular circumstances involved. For example, different monitoring techniques and/or different types of audience measurement meters 115 may be employed for media accessed via a desktop computer relative to the media accessed via a mobile computing device.

In some examples, the audience measurement meter 115 may be implemented as a software application that panelists agree to install on their devices to monitor all Internet usage activity on the respective devices. In some examples, the meter 115 may prompt a user of a particular device to identify themselves so that the AME 104 can confirm the identity of the user (e.g., whether it was the mother or daughter in a panelist household). In some examples, prompting a user to self-identify may be considered overly intrusive. Accordingly, in some such examples, the circumstances surrounding the behavior of the user of a panelist client device 112 (e.g., time of day, type of content being accessed, etc.) may be analyzed to infer the identity of the user to some confidence level (e.g., the accessing of children's content in the early afternoon would indicate a relatively high probability that a child is using the device at that point in time). In some examples, the audience measurement meter 115 may be a separate hardware device that is in communication with a particular panelist client device 112 and enabled to monitor the Internet usage of the panelist client device 112.

As mentioned above, in some examples, the AME panel data (stored in the AME panel data database 122) is merged with the database proprietor impressions data (stored in the matchable impressions database 118) within the privacy-protected cloud environment 106 to take advantage of the combination of the disparate sets of data to generate more robust and/or reliable audience measurement metrics. In particular, the database proprietor impressions data provides the advantage of volume. That is, the database proprietor impressions data corresponds to a much larger number of impressions than the AME panel data because the database proprietor impressions data includes census wide impression information that includes all impressions collected from both the panelist client devices 112 (associated with a relatively small pool of audience members) and the non-panelist client devices 114. The AME panel data provides the advantage of high-quality demographic data for a statistically significant pool of audience members (e.g., panelists) that may be used to correct for errors and/or biases in the database proprietor impressions data.

There are multiple sources of error in the database proprietor impressions data. Those include: the demographic information (e.g., age) for matchable users collected by the database proprietor 102 during user registration might not be truthful; a different person of a different age might be using a client device 110 on which a particular registered user is logged into their user account; multiple different people might use the same client device 110 to access media; the inability of the database proprietor 102 to match a particular impression to a particular user (e.g., the user is not signed in at the time of the media impression or has enabled limited ad tracking); the existence of multiple users accounts of a single registered user.

In some examples, the AME panel data is merged with the database proprietor impressions data by an example data matching analyzer 128. In some examples, the data matching analyzer 128 implements an application programming interface (API) that takes the disparate datasets and matches registered users in the database proprietor impressions data with panelists in the AME panel data. In some examples, registered users are matched with panelists based on the unique impression identifiers (e.g., CPNs) collected in connection with the media impressions logged by both the database proprietor 102 and the AME 104. The combined data is stored in an AME intermediary merged data database 130 within an AME privacy-protected data store 132. The data in the AME intermediary merged data database 130 is referred to as "intermediary" because it is at an intermediate stage in the processing because it includes AME panel data that has been enhanced and/or combined with the database proprietor impressions data, but has not yet been corrected or adjusted to account for the sources of error and/or bias in the database proprietor impressions data as outlined above.

In some examples, the AME intermediary merged data is analyzed by an adjustment factor analyzer 134 to calculate adjustment or calibration factors that may be stored in an adjustment factors database 136 within an AME output data store 138 of the AME proprietary cloud environment 126. In some examples, the adjustment factor analyzer 134 calculates different types of adjustment factors to account for different types of errors and/or biases in the database proprietor impressions data. For instance, a multi-account adjustment factor corrects for the situation of a single registered user accessing media using multiple different user accounts associated with the database proprietor 102. A signed-out adjustment factor corrects for non-coverage associated with registered users that access media while signed out of their account associated with the database proprietor 102 (so that the database proprietor 102 is unable to associate the impression with the registered users). In some examples, the adjustment factor analyzer 134 is able to directly calculate the multi-account adjustment factor and the signed-out adjustment factor in a deterministic manner.

While the multi-account adjustment factors and the signed-out adjustment factors may be deterministically calculated, correcting for falsified or otherwise incorrect demographic information (e.g., incorrectly self-declared ages) of registered users of the database proprietor 102 cannot be solved in such a direct and deterministic manner. Rather, in some examples, a machine learning model is developed to analyze and predict the correct ages of registered users of the database proprietor 102. Specifically, as shown in FIG. 1, the privacy-protected cloud environment 106 implements a model generator 140 to generate a demographic correction model using the AME intermediary merged data (stored in the AME intermediary merged data database 130) as inputs.

More particularly, in some examples, self-declared demographics (e.g., the self-declared age) of registered users of the database proprietor 102, along with other covariates associated with the registered users, are used as the input variables or features used to train a model to predict the correct demographics (e.g., correct age) of the registered users as validated by the AME panel data, which serves as the truth data or training labels for the demographic correction model generation. However, in some examples, the self-declared age or other demographics of a registered user signed into a user account on a panelist client device 112 may not match the age or other demographics of the primary user of the user account.

As used herein, the term "primary user of a user account" refers to an individual whose demographic information an AME should attribute to a user account based on a primary user identification algorithm. While in some instances identifying the primary user of a user account may be straightforward (e.g., when a user account is used by only one person), in other cases the identity of the primary user of a user account is not as forthcoming (e.g., when multiple people use the same user account). For example, a parent that buys a computer for a child may log into the computer with the parent's user account with the database proprietor 102 despite the child being the primary user of the parent's user account. Thus, because the registered user of a user account is not always the primary user of the user account, in some examples (e.g., in the case of a shared user account), merely relying on the demographics of the registered user may be insufficient to accurately monitor the demographics of the person exposed to media. By identifying the primary user of the user account, examples disclosed herein determine the demographics of the person that accessed media. Therefore, examples disclosed herein generate reliable demographics and/or other covariates associated with the registered users to train models to predict correct demographics.

In some examples, different demographic correction model(s) may be developed to correct for different types of demographic information that needs correcting. For instance, in some examples, a first model can be used to correct the self-declared age of registered users of the database proprietor 102 and a second model can be used to correct the self-declared gender of the registered users. Once the model(s) have been trained and validated based on the AME panel data, the model(s) are stored in a demographic correction models database 142.

As mentioned above, there are many different types of covariates collected and/or generated by the database proprietor 102. In some examples, the covariates provided by the database proprietor 102 may include a certain number (e.g., 100) of the top search result click entities and/or video watch entities for every user during a most recent period of time (e.g., for the last month). These entities are integer identifiers (IDs) that map to a knowledge graph of all entities for the search result clicks and/or videos watched. That is, as used in this context, an entity corresponds to a particular node in a knowledge graph maintained by the database proprietor 102. In some examples, the total number of unique IDs in the knowledge graph may number in the tens of millions. More particularly, for example, YouTube videos are classified across roughly 20 million unique video entity IDs and Google search results are classified across roughly 25 million unique search result entity IDs. In addition to the top search result click entities and/or video watch entities, the database proprietor 102 may also provide embeddings for these entities. An embedding is a numerical representation (e.g., a vector array of values) of some class of similar objects, images, words, and the like. For example, a particular user that frequently searches for and/or views cat videos may be associated with a feature embedding representative of the class corresponding to cats. Thus, feature embeddings translate relatively high dimensional vectors of information (e.g., text strings, images, videos, etc.) into a lower dimensional space to enable the classification of different but similar objects.

In some examples, multiple embeddings may be associated with each search result click entity and/or video watch entity. Accordingly, assuming the top 100 search result entities and video watch entities are provided among the covariates and that 16 dimension embeddings are provided for each such entity, this results in a 100×16 matrix of values for every user, which may be too much data to process during generation of the demographic correction models as described above. Accordingly, in some examples, the dimensionality of the matrix is reduced to a more manageable size to be used as an input feature for the demographic correction model generation.

In some examples, a process is implemented to track different demographic correction model experiments over time to achieve high quality (e.g., accurate) models and also for auditing purposes. Accomplishing this objective within the context of the privacy-protected cloud environment 106 presents several unique challenges because the model features (e.g., inputs and hyperparameters) and model performance (e.g., accuracy) are stored separately to satisfy the privacy constraints of the environment.

In some examples, a model analyzer 144 may implement and/or use one or more demographic correction models to generate predictions and/or inferences as to the actual demographics (e.g., actual ages) of registered users associated with media impressions logged by the database proprietor 102. That is, in some examples, as shown in FIG. 1, the model analyzer 144 uses one or more of the demographic correction models in the demographic correction models database 142 to analyze the impressions in the enriched impressions database 120 that were matched to a particular registered user of the database proprietor 102. The inferred demographic (e.g., age) for each registered user may be stored in a model inferences database 146 for subsequent use, retrieval, and/or analysis. Additionally or alternatively, in some examples, the model analyzer 144 uses one or more of the demographic correction models in the demographic correction models database 142 to analyze the entire registered user base of the database proprietor regardless of whether the registered users are matched to any particular media impressions. After inferring the correct demographic (e.g., age) for each registered user, the inferences are stored in the model inferences database 146. In some such examples, when the registered users matched to particular impressions are to be analyzed (e.g., the registered users matched to impressions in the enriched impressions database 120), the model analyzer 144 merely extracts the inferred demographic assignment to each relevant registered user in the enriched impressions database 120 that matches with one or more media impressions.

In some examples, the privacy constraints ensure that the data can only be extracted for review and/or analysis in aggregate so as to protect the privacy of any particular individual represented in the data (e.g., a panelist of the AME 104 and/or a registered user of the database proprietor 102). Accordingly, in some examples, a data aggregator 148 aggregates the audience measurement data associated with particular media campaigns before the data is provided to an aggregated campaign data database 150 in the AME output data store 138 of the AME proprietary cloud environment 126.

The data aggregator 148 may aggregate data in different ways for different types of audience measurement metrics. For instance, at the highest level, the aggregated data may provide the total impression count and total number of registered users (e.g., estimated audience size) exposed to the media 108 for a particular media campaign. As mentioned above, the total number of registered users reported by the data aggregator 148 is based on the total number of unique user accounts matched to impressions but does not include the individuals associated with impressions that were not matched to a particular registered user (e.g., non-coverage). However, the total number of unique user accounts does not account for the fact that a single individual may correspond to more than one user account (e.g., multi-account users), and does not account for situations where a person other than a registered user was exposed to the media 108 (e.g., misattribution). These errors in the aggregated data may be corrected based on the adjustment factors stored in the adjustment factors database 136. Further, in some examples, the aggregated data may include an indication of the demographic composition of the registered users represented in the aggregated data (e.g., number of males vs females, number of registered users in different age brackets, etc.).

Additionally or alternatively, in some examples, the data aggregator 148 may provide aggregated data that is associated with a particular aspect of a media campaign. For instance, the data may be aggregated based on particular websites (e.g., all media impressions served on YouTube-.com). In other examples, the data may be aggregated based on placement information (e.g., aggregated based on particular primary content videos accessed by users when the media advertisement was served). In other examples, the data may be aggregated based on device type (e.g., impressions served via a desktop computer versus impressions served via a mobile device). In other examples, the data may be aggregated based on a combination of one or more of the above factors and/or based on any other relevant factor(s).

In some examples, the privacy constraints imposed on the data within the privacy-protected cloud environment 106 include a limitation that data cannot be extracted (even when aggregated) for less than a threshold number of individuals (e.g., 50 individuals). Accordingly, if the particular metric being sought includes less than the threshold number of individuals, the data aggregator 148 will not provide such data. For instance, if the threshold number of individuals is 50 but there are only 46 females in the age range of 18-25 that were exposed to particular media 108, the data aggregator 148 would not provide the aggregate data for females in the 18-25 age bracket. Such privacy constraints can leave gaps in the audience measurement metrics, particularly in locations where the number of panelists is relatively small. Accordingly, in some examples, when audience measurement is not available for a particular demographic segment of interest in a particular region (e.g., a particular country), the audience measurement metrics in one or more comparable region(s) may be used to impute the metrics for the missing data in the first region of interest. In some examples, the particular metrics imputed from comparable regions are based on a comparison of audience metrics for which data is available in both regions. For instance, while data for females in the 18-25 bracket may be unavailable, assume that data for females in the 26-35 age bracket is available. The metrics associated with the 26-35 age bracket in the region of interests may be compared with metrics for the 26-35 age bracket in other regions and the regions with the closest metrics to the region of interest may be selected for use in calculating imputation factor(s).

As shown in the illustrated example, both the adjustment factors database 136 and the aggregated campaigns data database 150 are included within the AME output data store 138 of the AME proprietary cloud environment 126. As mentioned above, in some examples, the AME proprietary cloud environment 126 is provided by the database proprietor 102 and enables data to be provided to and retrieved from the privacy-protected cloud environment. In some examples, the aggregated campaign data and the adjustment factors are subsequently transferred to a separate computing system 152 of the AME 104 for analysis by an audience metrics analyzer 154. In some examples, the separate computing apparatus may be omitted with its functionality provided by the AME proprietary cloud environment 126. In other examples, the AME proprietary cloud environment 126 may be omitted with the adjustment factors and the aggregated data provided directly to the computing system 152. Further, in this example, the AME panel data database 122 is within the AME first party data store 124, which is shown as being separate from the AME output data store 138. However, in other examples, the AME first party data store 124 and the AME output data store 138 may be combined.

In the illustrated example of FIG. 1, the audience metrics analyzer 154 applies the adjustment factors to the aggregated data to correct for errors in the data including misattribution, non-coverage, and multi-count users.

Additionally or alternatively, in line with the discussion above, the audience metrics analyzer 154 can also process the aggregated data 150 to implement techniques that account for redaction of user-level information for privacy-sensitive events and/or users that have opted out of measurement. By way of example, the audience metrics analyzer 154, or more broadly, the computing system 152 can use a non-redacted unique viewer count for a set of digital content exposures and a redacted exposures count for the set of digital content exposures to determine a final unique viewer count for the set of digital content exposures. In some instances, the computing system 152 leverages an inverted reach curve and its corresponding reach curve to determine the final unique viewer count.

The output of the audience metrics analyzer 154 corresponds to the final calibrated data of the AME 104 and is stored in a final calibrated data database 156. Further, the computing system 152 also includes a report generator 158 to generate reports based on the final calibrated data. The computing system 152 can transmit the final calibrated data and/or a generated report(s) to another computing system via a network.

II. Example Operations

A. Overview

As noted above, described herein are systems and methods for estimating the unique viewer count for a set of digital content exposures. Some DEPs provide an indicator or flag for redacted digital content exposures, which allow for aggregating and counting redacted digital content exposures separately from non-redacted digital content exposures. Within examples, a count of redacted digital content exposures as well as a count of distinct user identifiers for non-redacted digital content exposures are provided as input to a reach curve model. The reach curve model can provide a non-linear estimate of the redacted digital content exposures' incremental audience. Because the estimate is non-linear, the reach curve model implicitly assumes that a given user can generate both redacted and non-redacted digital content exposures.

In one example, to create a reach curve model, an AME leverages panel data collected via one or more panels. Within the panels, an AME computing system collects internet usage for a variety of websites, including YouTube. For each panelist, the AME computing system records the number of page visits (or pageviews) for a given website for a given period of time (e.g. four months). The AME computing system also calculates the panelist probability by dividing each panelist's pageviews by the total number of pageviews across all panelists. This results in a distribution that reflects the relative frequency of viewing among panelists; panelists that visit YouTube often or view a lot of videos will have a larger probability than panelists that rarely visit YouTube or view only a few videos. In some instances, digital content exposures might not be available for panelists. Hence, pageviews can be utilized as a proxy for digital content exposures. Hereinafter, pageviews, impressions, and exposures are used interchangeably.

After a distribution across panelists is created, the AME computing system can create the reach curve input data. The reach curve is a mathematical relationship of audience versus digital content exposures, but this relationship might not be easily observed from the panel. For example, 100 exposures (or pageviews) may be observed from four panelists, and a panelist probability distribution across the panelists can be created utilizing the approach above. Further, suppose there are four new exposures for which it is desired to determine how many panelists are linked with those exposures. There are many possibilities. The digital content could have been viewed by one panelist, each of the four panelists, or different combinations of two or three panelists. This is essentially a combinatorics problem, with the probability of each combination determined using the panelist probability distribution described above.

Theoretically, the AME computing system could calculate the different combinations of panelists for N number of exposures and use the panelist probability distribution to calculate expected audience. However, this approach becomes quickly intractable as the number of panelists increases. Specifically, the number of combinations is $2^n-1$, where n is equal to the number of panelists. In this example, the number of combinations is $2^4-1=31$, which is manageable. However, the number of combinations escalates rapidly for larger panel sizes; a panel size of 100 would have $2^{100}-1=1.26\times10^{30}$ combinations, which would take lifetimes to calculate.

In some instances, the AME computing system relies on a methodology that uses the Principles of Inclusion and Exclusion (PIE) in concert with the binomial distribution to substantially simplify these calculations. In the above example, combinatorics were used to calculate which panelists viewed the four new exposures. However, with the PIE-binomial approach, the AME computing system calculates the probability that each panelist does not view one of the four exposures. Specifically, for each panelist, the AME computing system provides the panelist's probability as input to the binomial distribution, assuming zero successes and N number of trials. This returns the probability that the panelist did not view any of the N exposures. Further, the AME computing system subtracts this value from one to determine the probability that the panelist did view at least one of the N exposures. Lastly, the AME computing system uses this probability across all panelists to determine the expected (or average) audience value.

It can be shown that this approach produces identical results to the combinations approach, but with fewer calculations. Specifically, the number of calculations is $2*n+1$ where n is the number of panelists. With 100 panelists, there are 201 calculations instead of the $1.26\times10^{30}$ that would be required with the combinations approach. This procedure is repeated for multiple values (1, 10, 1,000, 50,000, etc.) of exposures (N). Lastly, the AME computing system fits an appropriate non-linear regression model (e.g. exponential or double exponential) to these data to determine a mathematical formulation of the reach curve. The mathematical formulation facilitates application of the reach curve as part of the calibration steps for third-party measurement via a protected cloud environment. The general form of the reach curve may be y=f(x), where y is audience and x is exposures.

Application of the reach curve as part of calibration is a multi-step process. By way of example, first, the AME computing system calculates the number of non-redacted digital content exposures and the non-redacted audience (count of unique identifiers) associated with these digital content exposures. Next, the AME computing system calculates the number of redacted digital content exposures, and finally the total digital content exposures (redacted+ non-redacted). The AME computing system then calculates the "scaling rate" by dividing the total digital content exposures by the non-redacted digital content exposures. Next, the AME computing system "inverts" the reach curve by rearranging the reach curve formula to solve for digital content exposures instead of audience. For example, the AME computing system can rearrange a reach curve of the general form y=f(x) such that the reach curve has a form of x=g(y). The AME computing system then provides the non-redacted audience as input to the "inverted reach curve." This yields the "initial exposures value," which the AME computing system then multiplies with the "scaling rate" to determine the "final exposures value." Lastly, the AME computing system provides the "final exposures value" as input to the reach curve (y=f(x)) to get the "final unique viewer count."

The difference between the final unique viewer count and non-redacted unique viewer count is the incremental audience of the redacted exposures. This is a non-linear estimate that implicitly assumes that a given user can generate both redacted and non-redacted exposures. This methodology to estimate unique viewers now accounts for both aggregate- and event-level privacy restrictions.

B. Operations Related to Determining Expected Audiences

As noted above, the techniques described herein leverage a reach curve model that defines a non-linear relationship between exposures and unique viewers for a set of digital content exposures. In some examples, the AME computing system utilizes the combination of principles of inclusion/ exclusion (PIE) and binomial distribution to generate training data for the reach curve.

Figure 2:
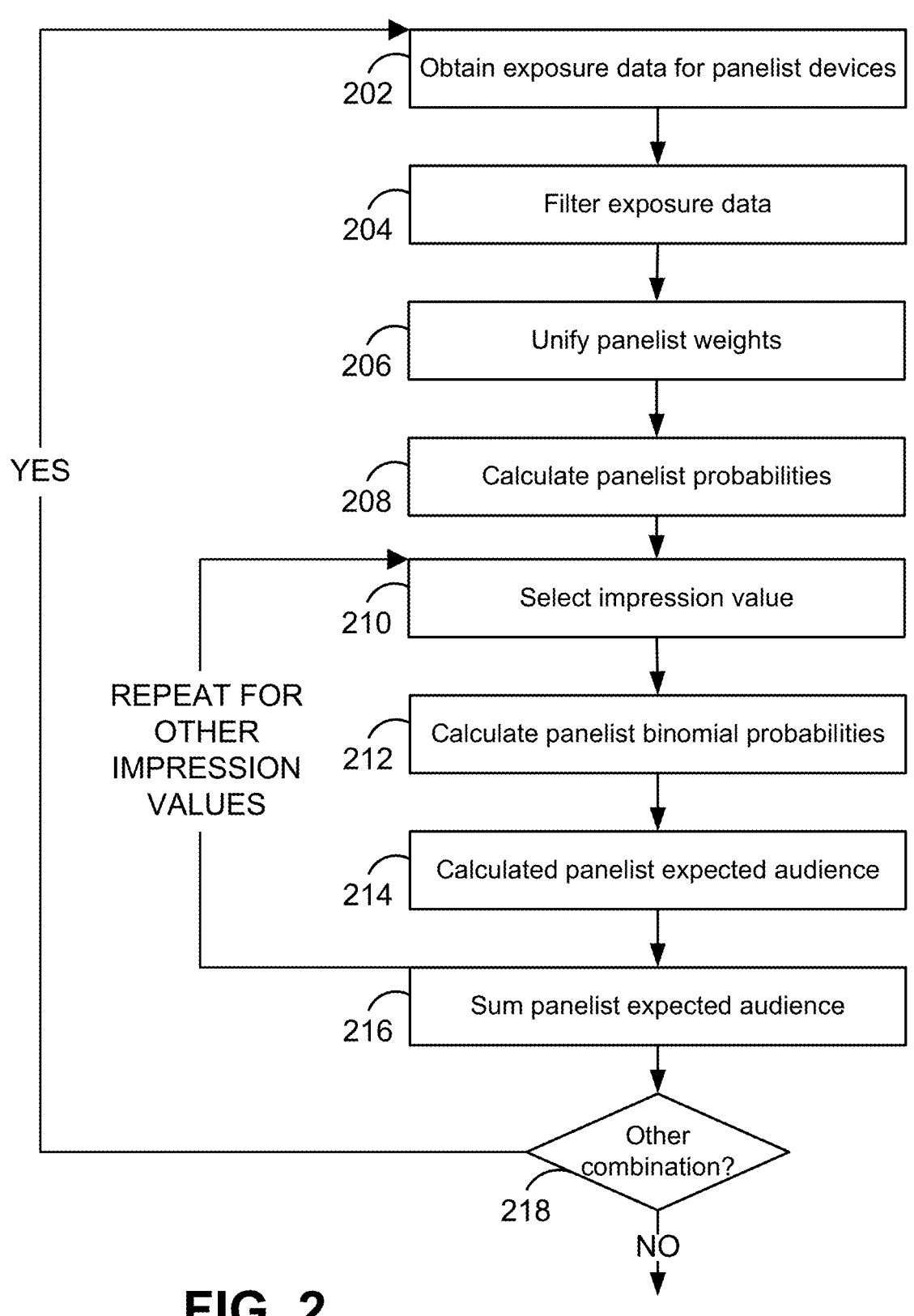
FIG. 2 shows example operations for determining expected audiences.

By way of example, FIG. 2 shows example operations for determining expected audiences. The example operations can be carried out by a computing system, such as the computing system 152 of FIG. 1.

As shown in FIG. 2, at block 202, the computing system obtains exposure data for panelist devices. The exposure data can be panel data collected from desktop and/or mobile devices in panel markets using AME meters. The panel data is indicative of a distribution that reflects a relative frequency of viewing among panelists.

Obtaining exposure data can involve selecting a specific panel market (e.g., a country or a region within a country), selecting a specific demographic bucket (e.g., based on age and/or gender), selecting a particular platform (e.g., desktop or mobile), and selecting a desired date range. The desired data range can include a number of days or a number of months. In some examples, the exposure data is pageview data (e.g., number of pageviews). In other examples, the exposure data is based on duration (e.g., number of exposures for at least five seconds, ten seconds, one minute, etc.).

At block 204, the computing system filters the exposure data. For instance, the computing system can filter pageview data to a desired website or combination of websites, such as YouTube, Facebook, TikTok, ESPN, CNN, etc.

At block 206, the computing system unifies panelist weights. Unifying the panelist weights can involve determining a weight for each panelist that adjusts for panelist that been part of the panel for only subset of the entire timeframe selected. In some examples, the weight is an indication of the number of people in a population represented by the panelist.

At block 208, the computing system calculates panelist probabilities. For instance, for each panelist, the computing system determines the number of pageviews. The computing system can then sum pageviews across panelists, and for each panelist, divide the count of pageviews by the sum.

At block 210, the computing system selects an impression value. The selected impression value represents an event that is viewed or not viewed by each panelist. The impression value can be any integer value, such as one, ten, one hundred, one thousand, etc.

At block 212, the computing system calculates panelist binomial probabilities. For instance, for each panelist, the computing system determines the panelist's excluded binomial probability using the binomial distribution of (k, n, p), where k is zero, n is the impression value from block 210, and p is the panelist probability from block 208. The computing system then determines the panelist included binomial probability as 1—the excluded binomial probability.

At block 214, the computing system calculates the panelist expected audience. According to one approach, the computing system multiples the panelist included binomial probability from block 210 by the panelist weight from block 206. The panelist weight can be set to one for unweighted calculations.

At block 216, the computing system sums the panelist expected audience values from block 214 across all panelists to obtain the total expected audience.

Additionally, blocks 210, 212, 214, and 216 are repeated for additional impression values. As such, the computing system determines expected audiences for a range of possible numbers of exposures using the distribution indicated by the panel data.

Further, at block 218, a determination is made as to whether there are other combinations of demographic, panel markets, platforms, or websites for which the expected audiences are desired. If so, the expected audiences are calculated in a similar manner for the other combinations.

C. Operations Related to Determining a Reach Curve

In line with the discussion above, the computing system can fit a model to the expected audience data to generate a reach curve. In some examples, the reach curve defines a non-linear relationship between exposures and unique viewers for a set of digital content exposures. By way of example, the computing system can fit a double exponential model to the expected audience data to generate a reach curve. With this approach, the reach curve is a mathematical formula of the expected audience versus impressions relationship from the panel. This formula may facilitate application of the reach curve to campaign data. In some instances, this process is repeated for all available demographic buckets, platforms, and markets available in the panel data. For example, the computing system can fit a reach curve to various panel market by platform by demographic combinations.

In some instances, the reach curve is a double exponential rise to maximum curve of the form $y=a*(1-e^{-bx})+c*(1-e^{-dx})$, where y=unique audience, x=impressions, a+c is the asymptote, which is approximately equal to the universe sample, and b and d are shape parameters. Generating the reach curve can involve storing parameters a, b, c, and d, for a given combination of demographic bucket, platform, and market in a memory. In other instances, the reach curve is a single exponential rise to maximum curve. The computing system can use a curve fitting library to fit a reach curve to expected audience data.

In some instances, prior to fitting the reach curve, the computing system filters the expected audience data to impression values that have expected audiences of less than 95% of the maximum expected audience. This can help avoid over-fitting on high expected audience values. For instance, for a given combination, 95% of the maximum expected audience may occur at about 10,000 impressions. Thus, all impression values between 10,000 and 50,000 (the maximum) may have close to the same expected audience value. These values can be removed to ensure that the reach curve does not become over-fit for these high expected audience values.

Figure 3:
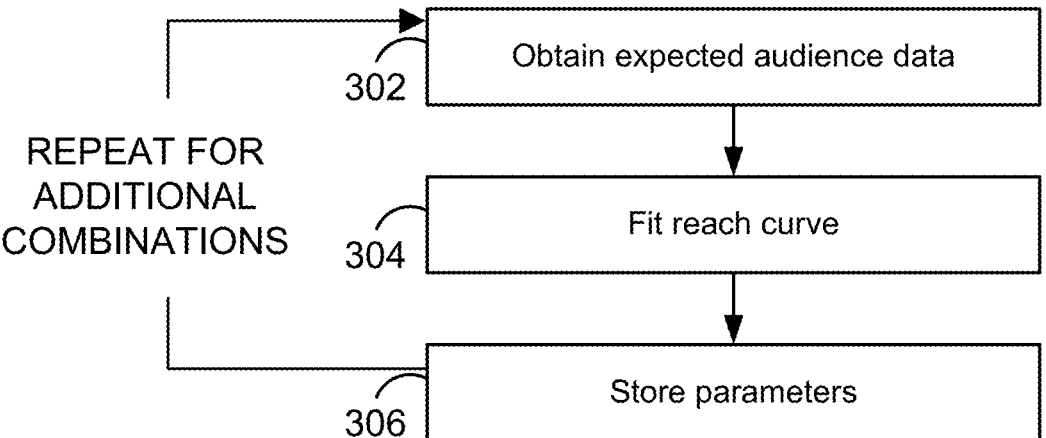
FIG. 3 shows example operations for determining reach curves.

FIG. 3 shows example operations for determining reach curves. The example operations can be carried out by a computing system, such as the computing system 152 of FIG. 1.

As shown in FIG. 3, at block 302, the computing system obtains expected audience data. For instance, the computing system can obtain expected audience data for a combination of interest, such as a combination of a demographic group, panel market, platform, and website. The expected audience data can indicate expected audiences for a range of impression values. The expected audience data can be generated using the operations discussed above with respect to FIG. 2, or any other technique for generating expected audience data as disclosed herein.

At block 304, the computing system fits a reach curve to the expected audience data. In some examples, the computing system fits a regression line to the expected audience data. For instance, the regression line can be a non-linear regression line, such as an exponential or a double-exponential rise to a maximum. Fitting the reach curve can involve determining parameters of a model (e.g., parameters that define a regression line).

At block 306, the computing system stores the parameters in a database for subsequent use in determining a unique viewer count by leveraging data from a DEP. The computing system can also store data indicative of the form of the reach curve (e.g., data indicated that the curve is a single exponential, a double exponential, etc.).

The computing system can repeat the operations at blocks 302, 304, and 306 for other combinations of interest, such as other combinations of demographic group, panel market, platform, and website.

D. Operations Related to Determining Unique Viewer Count

In line with the discussion above, the computing system can use a reach curve to estimate the unique viewer count for a set of digital content exposures. By way of example, to estimate the unique viewer count, the computing system can plug in an initial audience estimate to a reach curve for a combination of market, demographic, platform, and website. The computing system can re-arrange the reach curve equation to solve for an initial exposures value. The computing system can then scale the initial exposures value by a redacted/optout scaling factor to obtain a final exposures value. Further, the computing system can use the final exposures value and the reach curve to obtain a final unique viewer count for the set of digital content exposures. Non-linearly estimating the redacted/optout impressions provides the benefit of implicitly allowing some signed-in users to also have redacted/optout impressions. This improves the calculation of frequency and improves the overall audience estimate as compared to prior approaches that rely on linear estimation.

In some examples, the initial exposures value is solved for using an inverted reach curve. The inverted reach curve is the inverse of the reach curve. For instance, as noted above, the reach curve is generally of the form y=x, where y is the expected audience, and x is the impressions value. The inverted reach curve is the reach curve rearranged to solve for x given y. With one approach, the reach curve is of the form $y=a*(1-e^{-bx})+c*(1-e^{-dx})$ noted above. A non-linear equation solver can be used to determine the value of x given values of y, a, b, c, and d. For instance, the open source library SciPy includes a function spicy.optimize.fsolve that returns the value of x given a non-linear equation and values for the other parameters of the non-linear equation. The computing system can provide the inverse function of the reach curve (e.g., $a*(1-e^{-bx})+c*(1-e^{-dx})$ as well as values of y, a, b, c, and d as inputs to the function, so as to obtain the initial exposures value x.

Figure 4:
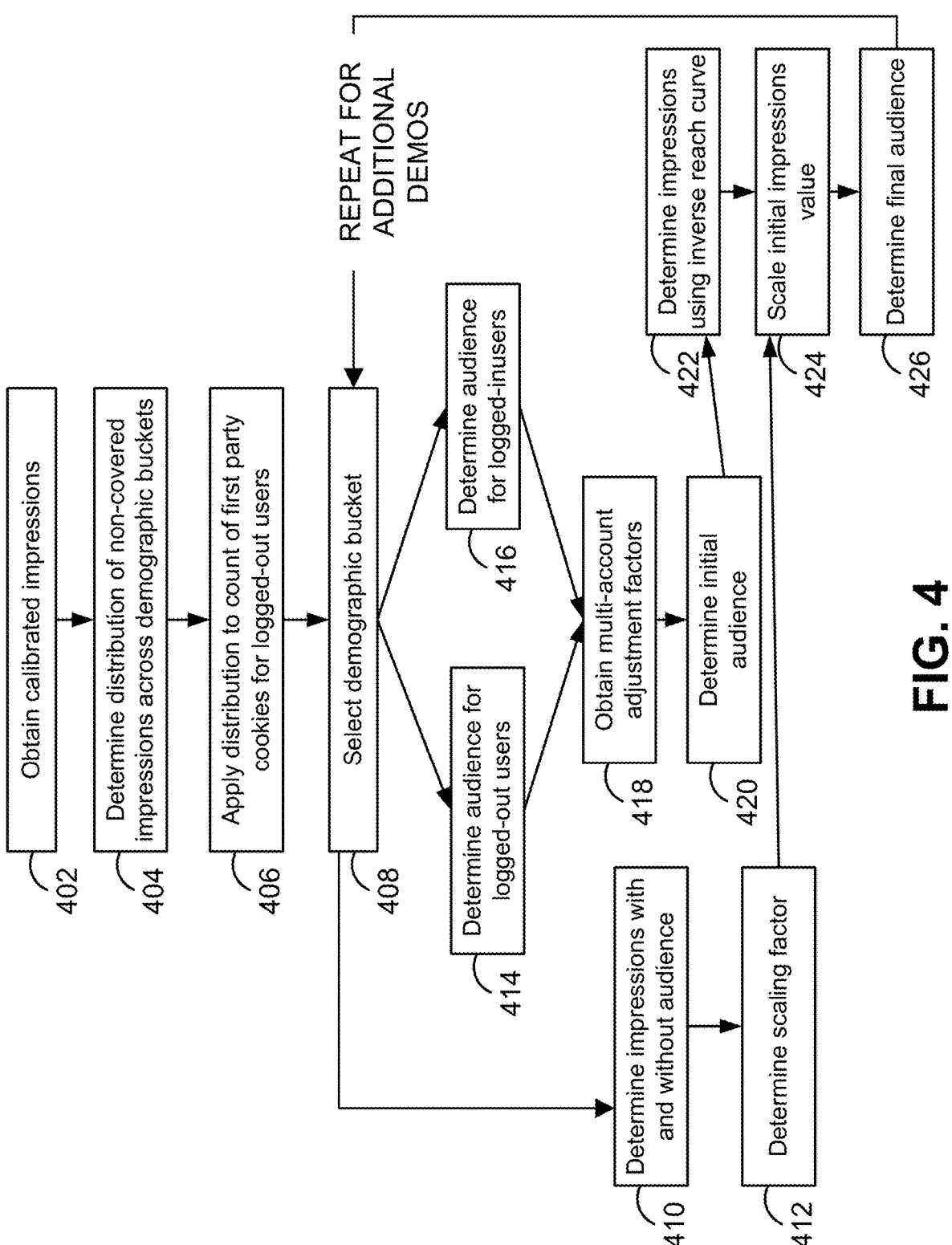
FIG. 4 shows example operations for applying reach curves.

FIG. 4 shows example operations for applying reach curves. The example operations can be carried out by a computing system, such as the computing system 152 of FIG. 1. The operations can be carried out for a given combination of market, website, and platform.

As shown in FIG. 4, at block 402, the computing system obtains calibrated impressions. For instance, the computing system can obtain impressions that have been calibrated for sharing and non-coverage by the audience metrics analyzer 154 of FIG. 1. As part of the non-coverage calibration, impressions are scaled to assure alignment with the total number of exposures (non-redacted+redacted) extracted for a particular combination with the data aggregator 148. Said otherwise, the calibrated impressions summed across demographic buckets will equal the total number of exposures (non-redacted+redacted) extracted for a particular combination with the data aggregator 148. Thus, calibrated impressions is synonymous with total scaled impressions.

At block 404, the computing system determines a distribution of non-covered impressions across demographic buckets. Non-covered impressions are impressions measured by the DEP for users that access media while signed out of their account. For each demographic bucket, the computing system can subtract covered impressions (impressions that the database proprietor is able to associate with registered users) from total scaled impressions to obtain non-covered impressions for each demographic bucket. The computing system can then sum the values of non-covered impressions across demographic buckets, and divided the non-covered impressions for respective demographic buckets by the sum to obtain a distribution of non-covered impressions across the demographic buckets.

At block 406, the computing system applies the distribution to a count of first party cookies for logged-out users. The count of cookies for logged-out users is an aggregated value extracted from the privacy protected cloud environment of the database proprietor. The computing system can apply the distribution by multiplying the distribution from block 404 by the values extracted from the privacy protected cloud environment. As such, each demographic can be allocated some of the logged-out cookies.

At block 408, the computing system selects a demographic bucket. For instance, the computing system can select one of twenty-four demographic buckets that are defined by a combination of gender and age. In other examples, the demographic buckets can be defined by alternative or additional demographic characteristics.

At block 410, the computing system determines impressions with and without audience. Impressions with audience can include two parts. The first part is the covered impressions obtained at block 402. The second part is the impressions associated with the first party cookies for logged-out users. The second part can be the aggregated value mentioned above with reference to block 406. The computing system determines the impressions with audience by summing the first part and the second part. The computing system determines the impressions without audience by subtracting the impressions with audience from the total scaled impressions. The impressions without audience is equal to that demographic's share of the redacted impressions. Thus, impressions without audience summed across demographic is equal to the redacted impressions extracted with the data aggregator 148 for that particular combination.

At block 412, the computing system determines a scaling factor. For instance, the computing system can divide the total scaled impressions by the impressions with audience.

At block 414, the computing system determines the audience for logged-out users allocated to the demographic bucket. The computing system previously determined this number at block 406.

At block 416, the computing system determines the audience for logged-in users for the demographic bucket. The computing system determines the audience for logged-in users by dividing the calibrated, covered impressions by the provider frequency, where provider frequency is the impressions aggregated and extracted from the privacy protected cloud environment divided by the unique audience aggregated and extracted from the privacy protected cloud environment (unique audience may be the count of unique account identifiers). By way of example, there may be 100 aggregated impressions for the demographic bucket, and a unique audience of 25, such that the provider frequency is 4. Given a calibrated, covered impressions amount of 200, the audience for logged-in users is therefore 200/4=50.

At block 418, the computing system obtains multi-account adjustment factors. For instance, the computing system can obtain the adjustment factors from the adjustment factor database 136 of FIG. 1.

At block 420, the computing system determines an initial audience. The computing system can determine the initial audience by summing the audience for logged-out users (from block 414) and the audience for logged-in users (from block 416), and multiplying the sum by the multi-account adjustment factors.

At block 422, the computing system determines an initial impressions value using the inverse reach curve for the demographic bucket. For instance, the computing system can determine an initial impressions value using the inverted reach curve and the initial audience from block 420. Determining the impressions can involve retrieving parameters of the reach curve for the demographic bucket from a database.

At block 424, the computing system scales the initial impressions value by the scaling factor from block 412 so as to obtain a final impressions value.

And at block 426, the computing system determines a final audience using the reach curve. For instance, the computing system provides the final impressions value as input to the reach curve so as to obtain the final unique viewer count for the demographic bucket.

In some instances, the computing system repeats the operations at blocks 408-426 for additional demographic buckets.

In addition, in some instances, the computing system repeats the operations at block 402-426 for additional combinations of market, website, and platform.

III. Example Data

FIGS. 5-7 show example data. As shown in FIG. 5, panel data 502 indicates the number of impressions attributed to each of four panelists, and the corresponding implied distribution. FIG. 5 also shows the probabilities 504 for two impressions served to those same four panelists. The probabilities 504 for each scenario are determined using the implied distributions. For instance, the probability that panelist p1 viewed both the first impression and the second impression is 0.7*0.7=0.49.

FIG. 6 shows expected audience estimates determined using a combination approach and the panel data 502 of FIG. 5. The expected audience data 602 indicates that the expected audience for one impression is 1, the expected audience for two impressions is 1.46, the expected audience for three impressions is 1.74, and the expected audience for four impressions is 1.94.

FIG. 7 shows expected audience data 702 determined using the PIE binomial approach described herein. Notably, the expected audience data 702 is the same as the expected audience data 602 of FIG. 6, but can be determined with significantly fewer calculations. Hence, the PIE binomial approach provides a solution that is faster than the combination approach. Moreover, the PIE binomial approach is scalable to larger numbers of panelists and impressions.

IV. Example Method

FIG. 8 is a flow chart of an example method 800. The method 800 can be carried out by a computing system of an AME. At block 802, the method 800 includes obtaining, from a DEP, a non-redacted unique viewer count for a set of digital content exposures. The DEP provides a protected cloud environment for enriching digital content exposures. The non-redacted viewer count is obtained via the protected cloud environment. At block 804, the method 800 includes obtaining, from the DEP via the protected cloud environment, a redacted exposures count for the set of digital content exposures. At block 806, the method 800 includes determining, using an inverted reach curve and the non-redacted unique viewer count, an initial exposures value for the set of digital content exposures. At block 808, the method 800 includes scaling the initial exposures value using the redacted exposures count to obtain a final exposures value. At block 810, the method 800 includes determining, using a reach curve and the final exposures value, a final unique viewer count for the set of digital content exposures. And at block 812, the method 800 includes outputting the final unique viewer count for the set of digital content exposures.

V. Example Computing System

Any one or more of the above-described components, such as the computing system of the AME, can take the form of a computing device, or a computing system that includes one or more computing devices.

Figure 9:
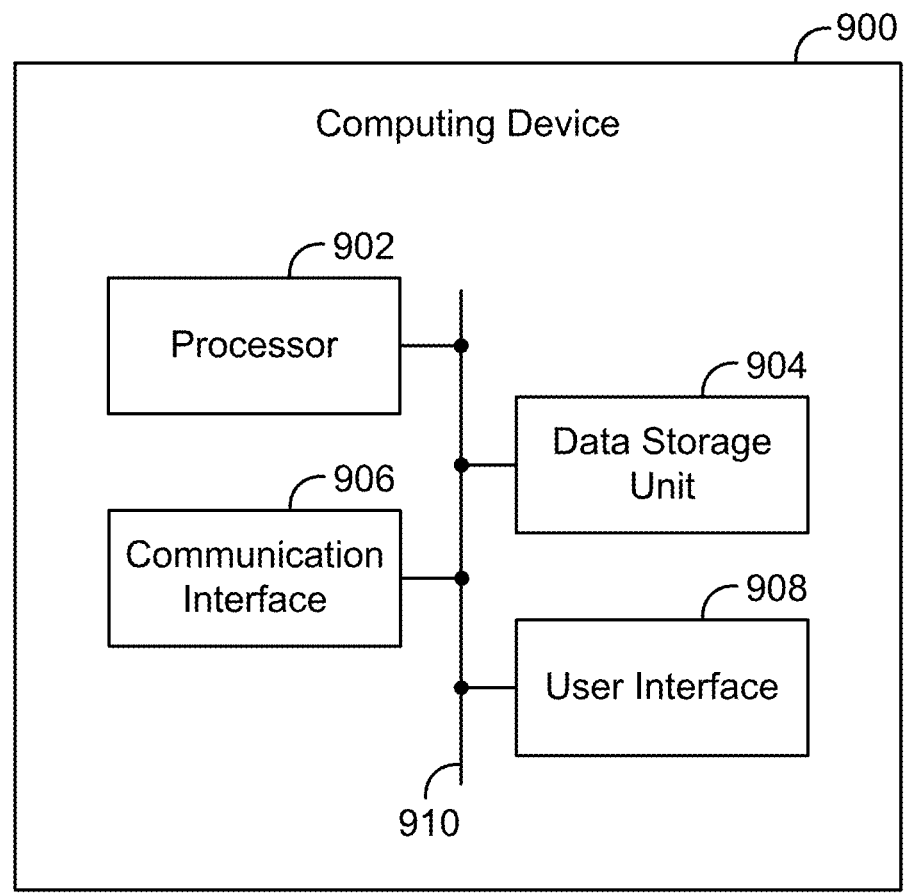
FIG. 9 is a simplified block diagram of an example computing device.

FIG. 9 is a simplified block diagram of an example computing device 900. The computing device 900 can be configured to perform one or more operations, such as the operations described in this disclosure. As shown, the computing device 900 can include various components, such as a processor 902, memory 904, a communication interface 906, and/or a user interface 908. These components can be connected to each other (or to another device, system, or other entity) via a connection mechanism 910.

The processor 902 can include one or more general-purpose processors and/or one or more special-purpose processors.

The memory 904 can include one or more volatile, non-volatile, removable, and/or non-removable storage components, such as magnetic, optical, or flash storage, and/or can be integrated in whole or in part with the processor 902. Further, the memory 904 can take the form of a non-transitory computer-readable storage medium, having stored thereon computer-readable program instructions (e.g., compiled or non-compiled program logic and/or machine code) that, upon execution by the processor 902, cause the computing device 700 to perform one or more operations, such as those described in this disclosure. The program instructions can define and/or be part of a discrete software application. In some examples, the computing device 700 can execute the program instructions in response to receiving an input (e.g., via the communication interface 906 and/or the user interface 908). The memory 904 can also store other types of data, such as those types described in this disclosure. In some examples, the memory 704 can be implemented using a single physical device, while in other examples, the memory 704 can be implemented using two or more physical devices.

The communication interface 906 can include one or more wired interfaces (e.g., an Ethernet interface) or one or more wireless interfaces (e.g., a cellular interface, Wi-Fi interface, or Bluetooth® interface). Such interfaces allow the computing device 900 to connect with and/or communicate with another computing device over a computer network (e.g., a home Wi-Fi network, cloud network, or the Internet) and using one or more communication protocols. Any such connection can be a direct connection or an indirect connection, the latter being a connection that passes through and/or traverses one or more entities, such as a router, switcher, server, or other network device. Likewise, in this disclosure, a transmission of data from one computing device to another can be a direct transmission or an indirect transmission.

The user interface 908 can facilitate interaction between computing device 700 and a user of computing device 900, if applicable. As such, the user interface 908 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, the user interface 908 can include hardware and/or software components that facilitate interaction between the computing device 900 and the user of the computing device 900.

The connection mechanism 910 can be a cable, system bus, computer network connection, or other form of a wired or wireless connection between components of the computing device 900.

One or more of the components of the computing device 900 can be implemented using hardware (e.g., a digital signal processor (DSP), an application-specific integrated circuit (ASIC), a field-programmable gate array (FPGA), another programmable logic device, or discrete gate or transistor logic), software executed by one or more processors, firmware, or any combination thereof. Moreover, any two or more of the components of the computing device 700 can be combined into a single component, and the function described herein for a single component can be subdivided among multiple components.

VI. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A computing system comprising a processor and a memory, the computing system configured to perform a set of acts comprising:

obtaining, from a data enrichment provider (DEP), a non-redacted unique viewer count for a set of digital content exposures, wherein DEP provides a protected cloud environment for enriching digital content exposures, and wherein the non-redacted unique viewer count is obtained via the protected cloud environment;

obtaining, from the DEP via the protected cloud environment, a redacted exposures count for the set of digital content exposures;

determining, using an inverted reach curve and the non-redacted unique viewer count, an initial exposures value for the set of digital content exposures;

scaling the initial exposures value using the redacted exposures count to obtain a final exposures value;

determining, using a reach curve and the final exposures value, a final unique viewer count for the set of digital content exposures; and outputting the final unique viewer count for the set of digital content exposures.

2. The computing system of claim 1, wherein the redacted exposures count is a sum of exposures for which user-level information is redacted by the DEP.

3. The computing system of claim 2, wherein the reach curve defines a non-linear relationship between exposures and unique viewers for the set of digital content exposures.

4. The computing system of claim 3, wherein the set of acts further comprises determining the reach curve using panel data for the set of digital content exposures.

5. The computing system of claim 4, wherein the panel data for the set of digital content exposures is indicative of a distribution that reflects a relative frequency of viewing among panelists.

6. The computing system of claim 5, wherein:

the set of acts further comprises determining expected audiences for a range of possible numbers of exposures using the distribution, and determining the reach curve comprises determining the reach curve using the expected audiences for the range of possible numbers of exposures.

7. The computing system of claim 4, wherein the panel data is collected using meters installed on computing devices of panelists of an audience measurement entity.

8. A method comprising:

obtaining, from a data enrichment provider (DEP), a non-redacted unique viewer count for a set of digital content exposures, wherein DEP provides a protected cloud environment for enriching digital content exposures, and wherein the non-redacted unique viewer count is obtained via the protected cloud environment;

obtaining, from the DEP via the protected cloud environment, a redacted exposures count for the set of digital content exposures;

determining, using an inverted reach curve and the non-redacted unique viewer count, an initial exposures value for the set of digital content exposures;

scaling the initial exposures value using the redacted exposures count to obtain a final exposures value;

determining, using a reach curve and the final exposures value, a final unique viewer count for the set of digital content exposures; and outputting the final unique viewer count for the set of digital content exposures.

9. The method of claim 8, wherein the redacted exposures count is a sum of exposures for which user-level information is redacted by the DEP.

10. The method of claim 9, wherein the reach curve defines a non-linear relationship between exposures and unique viewers for the set of digital content exposures.

11. The method of claim 10, further comprising determining the reach curve using panel data for the set of digital content exposures.

12. The method of claim 11, wherein the panel data for the set of digital content exposures is indicative of a distribution that reflects a relative frequency of viewing among panelists.

13. The method of claim 12, wherein:

the method further comprises determining expected audiences for a range of possible numbers of exposures using the distribution, and determining the reach curve comprises determining the reach curve using the expected audiences for the range of possible numbers of exposures.

14. The method of claim 11, wherein the panel data is collected using meters installed on computing devices of panelists of an audience measurement entity.

15. A non-transitory computer-readable medium having stored therein instructions that when executed by a computing system cause the computing system to perform a set of acts comprising:

obtaining, from a data enrichment provider (DEP), a non-redacted unique viewer count for a set of digital content exposures, wherein DEP provides a protected cloud environment for enriching digital content exposures, and wherein the non-redacted unique viewer count is obtained via the protected cloud environment;

obtaining, from the DEP via the protected cloud environment, a redacted exposures count for the set of digital content exposures;

determining, using an inverted reach curve and the non-redacted unique viewer count, an initial exposures value for the set of digital content exposures;

scaling the initial exposures value using the redacted exposures count to obtain a final exposures value;

determining, using a reach curve and the final exposures value, a final unique viewer count for the set of digital content exposures; and outputting the final unique viewer count for the set of digital content exposures.

16. The non-transitory computer-readable medium of claim 15, wherein the redacted exposures count is a sum of exposures for which user-level information is redacted by the DEP.

17. The non-transitory computer-readable medium of claim 16, wherein the reach curve defines a non-linear relationship between exposures and unique viewers for the set of digital content exposures.

18. The non-transitory computer-readable medium of claim 17, wherein the set of acts further comprises determining the reach curve using panel data for the set of digital content exposures.

19. The non-transitory computer-readable medium of claim 18, wherein the panel data for the set of digital content exposures is indicative of a distribution that reflects a relative frequency of viewing among panelists.

20. The non-transitory computer-readable medium of claim 19, wherein:

the set of acts further comprises determining expected audiences for a range of possible numbers of exposures using the distribution, and determining the reach curve comprises determining the reach curve using the expected audiences for the range of possible numbers of exposures.

* * * * *